United States Patent
Oda et al.

(10) Patent No.: US 11,335,485 B2
(45) Date of Patent: *May 17, 2022

(54) MULTILAYER ELECTRICAL STEEL SHEET

(71) Applicant: JFE STEEL CORPORATION, Tokyo (JP)

(72) Inventors: Yoshihiko Oda, Tokyo (JP); Yoshiaki Zaizen, Tokyo (JP); Tatsuhiko Hiratani, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 69 days.

This patent is subject to a terminal disclaimer.

(21) Appl. No.: 16/770,947

(22) PCT Filed: Dec. 10, 2018

(86) PCT No.: PCT/JP2018/045356
§ 371 (c)(1),
(2) Date: Jun. 9, 2020

(87) PCT Pub. No.: WO2019/117095
PCT Pub. Date: Jun. 20, 2019

(65) Prior Publication Data
US 2021/0134500 A1     May 6, 2021

(30) Foreign Application Priority Data

Dec. 12, 2017 (JP) .............................. JP2017-238062

(51) Int. Cl.
*B32B 15/00* (2006.01)
*H01F 1/147* (2006.01)
(Continued)

(52) U.S. Cl.
CPC ........ *H01F 1/14775* (2013.01); *B32B 15/011* (2013.01); *C21D 6/008* (2013.01);
(Continued)

(58) Field of Classification Search
None
See application file for complete search history.

(56) References Cited

U.S. PATENT DOCUMENTS 5,993,568 A * 11/1999 Takada ................. C21D 8/1277
148/304
10,102,951 B2   10/2018 Oda et al.
(Continued)

FOREIGN PATENT DOCUMENTS

CN       105189799 A     12/2015
JP       H0841601 A      2/1996
(Continued)

OTHER PUBLICATIONS

Sep. 22, 2020, the Extended European Search Report issued by the European Patent Office in the corresponding European Patent Application No. 18888022.3.

(Continued)

*Primary Examiner* — Seth Dumbris
(74) *Attorney, Agent, or Firm* — Kenja IP Law PC

(57) ABSTRACT

Provided is a multilayer electrical steel sheet having low high-frequency iron loss and high magnetic flux density. The multilayer electrical steel sheet has an inner layer and surface layers provided on both sides of the inner layer, in which the surface layers and inner layer have predetermined chemical compositions, the multilayer electrical steel sheet having: $\Delta Si$ of 0.5 mass % or more, $\Delta Si$ being defined as a difference between a Si content in the surface layer $[Si]_1$ and a Si content in the inner layer $[Si]_0$ represented by $[Si]_1 - [Si]_0$; $\Delta\lambda_{1.0/400}$ of $1.0\times10^{-6}$ or less, $\Delta\lambda_{1.0/400}$ being defined as an absolute value of the difference between a magnetostriction of the surface layer $\lambda_{1.0/400,1}$ and a magnetostriction of
(Continued)

the inner layer $\lambda_{1.0/400,0}$; a sheet thickness t of 0.03 mm to 0.3 mm, and a ratio of a total thickness of the surface layers $t_1$ to t of from 0.10 to 0.70.

4 Claims, 5 Drawing Sheets

(51) Int. Cl.

| | |
|---|---|
| *B32B 15/01* | (2006.01) |
| *C21D 6/00* | (2006.01) |
| *C21D 8/12* | (2006.01) |
| *C21D 9/46* | (2006.01) |
| *C22C 38/00* | (2006.01) |
| *C22C 38/02* | (2006.01) |
| *C22C 38/14* | (2006.01) |
| *C22C 38/60* | (2006.01) |

(52) U.S. Cl.
CPC ......... *C21D 8/1222* (2013.01); *C21D 8/1233* (2013.01); *C21D 8/1261* (2013.01); *C21D 9/46* (2013.01); *C22C 38/002* (2013.01); *C22C 38/008* (2013.01); *C22C 38/02* (2013.01); *C22C 38/14* (2013.01); *C22C 38/60* (2013.01); *B32B 2250/03* (2013.01); *B32B 2250/40* (2013.01); *B32B 2307/208* (2013.01); *B32B 2307/732* (2013.01); *C22C 2202/02* (2013.01); *Y10T 428/12958* (2015.01)

(56) References Cited

U.S. PATENT DOCUMENTS

2002/0134466 A1    9/2002   Namikawa et al.
2006/0243351 A1*   11/2006   Ohashi .................... C22C 38/02
                                                                          148/112
2015/0013850 A1    1/2015   Imamura et al.
2018/0340239 A1   11/2018   Okubo et al.
2019/0112697 A1*   4/2019   Hiratani .................... C21D 1/74

FOREIGN PATENT DOCUMENTS

| | | | |
|---|---|---|---|
| JP | H11293415 A | | 10/1999 |
| JP | H11293422 A | | 10/1999 |
| JP | 2001003145 A | * | 1/2001 |
| JP | 2005240185 A | | 9/2005 |
| JP | 2010063252 A | | 3/2010 |
| JP | 2010132938 A | | 6/2010 |
| JP | 2012251191 A | | 12/2012 |
| JP | 2013159823 A | | 8/2013 |
| TW | 201134953 A | | 10/2011 |
| TW | 201716158 A | | 5/2017 |
| WO | WO-2017170749 A1 | * | 10/2017 ........... C21D 8/1255 |

OTHER PUBLICATIONS

Feb. 12, 2019, International Search Report issued in the International Patent Application No. PCT/JP2018/045356.

May 28, 2019, Office Action issued by the Taiwan Intellectual Property Office in the corresponding Taiwanese Patent Application No. 107144576 with English language Search Report.

Mar. 9, 2021, Office Action issued by the China National Intellectual Property Administration in the corresponding Chinese Patent Application No. 201880079751.3 with English language search report.

Fengxi Lu et al., Foreign cold-rolled silicon steel production technology, 2013, p. 230, Metallurgical Industry Press.

\* cited by examiner

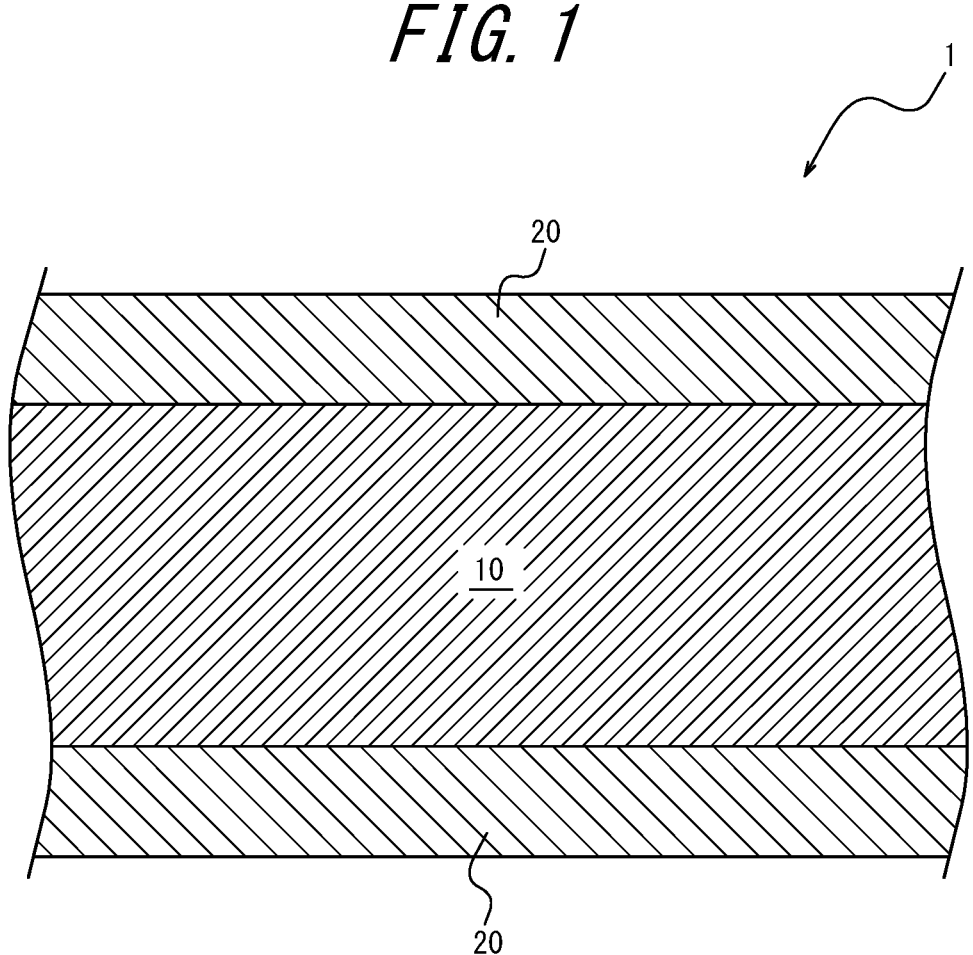

MULTILAYER ELECTRICAL STEEL SHEET

TECHNICAL FIELD

This disclosure relates to a multilayer electrical steel sheet, and in particular, a multilayer electrical steel sheet having excellent elongation and both low high-frequency iron loss and high magnetic flux density.

BACKGROUND

Motors for hybrid electric vehicles and cleaners are driven in a high-frequency region such as 400 Hz to 2 kHz from the viewpoint of reducing the size and achieving high efficiency. Therefore, for non-oriented electrical steel sheets used for core materials of such motors, electrical steel sheets having low high-frequency iron loss and high magnetic flux density are demanded.

To reduce the high-frequency iron loss, it is effective to increase specific resistance. Therefore, high-Si steel having increased specific resistance through the increase in the Si content has been developed. However, since Si is a nonmagnetic element, the increase in the Si content leads to lower saturation magnetization.

Therefore, as means for achieving both high-frequency iron loss reduction and high magnetic flux density, gradient Si magnetic materials having controlled Si concentration gradient in a thickness direction of electrical steel sheets have been developed. For example, JP H11-293422 A (PTL 1) proposes an electrical steel sheet having a Si concentration gradient in a thickness direction in which the Si concentration in a surface of the steel sheet is higher than that of a mid-thickness part of the steel sheet. Specifically, the electrical steel sheet has a mid-thickness part with a Si concentration of 3.4% or more while having, on its both surfaces, surface layers with a Si concentration of 5 mass % to 8 mass %. Further, the thickness of the surface layers is 10% or more of the sheet thickness.

CITATION LIST

Patent Literature

PTL 1: JP H11-293422 A

SUMMARY

Technical Problem

However, when conventional gradient Si magnetic materials as proposed in PTL 1 are used as the iron core materials of electric appliances whose highest frequency is several kHz, the hysteresis loss is high and thus the iron loss is not sufficiently reduced.

Further, when an electric steel sheet is processed into a core of a motor and the like, a plurality of electrical steel sheets are typically stacked and then interlocked to thereby fix the steel sheets to each other. From the viewpoint of ensuring the workability at that time, the electrical steel sheet is required to have excellent "elongation".

It could thus be helpful to provide a multilayer electrical steel sheet having excellent elongation and both low high-frequency iron loss and high magnetic flux density.

Solution to Problem

The inventors made intensive studies of a method of solving the problem, and as a result, found that in order to reduce high-frequency iron loss, it is important to reduce the difference in magnetostriction between surface layers and an inner layer of a steel sheet. This disclosure is based on the above finding and has the following primary features.

1. A multilayer electrical steel sheet comprising an inner layer and surface layers provided on both sides of the inner layer, wherein each of the surface layers has a chemical composition containing (consisting of), in mass %,
C: 0.001% to 0.01%,
Si: 2.5% to 6.0%, and
Ti: 0% to 0.005%, with the balance being Fe and inevitable impurities, the inner layer has a chemical composition containing (consisting of)
C: 0.001% to 0.01%,
Si: 1.5% to 5.0%, and
Ti: 0% to 0.005%, with the balance being Fe and inevitable impurities, and the multilayer electrical steel sheet has:
$\Delta$Si of 0.5 mass % or more, $\Delta$Si being defined as a difference between a Si content in each of the surface layers $[Si]_1$ and a Si content in the inner layer $[Si]_0$ represented by $[Si]_1 - [Si]_0$;
$\Delta\lambda_{1.0/400}$ of $1.0\times10^{-6}$ or less, $\Delta\lambda_{1.0/400}$ being defined as an absolute value of the difference between a magnetostriction of each of the surface layers $\lambda_{1.0/400,1}$ and a magnetostriction of the inner layer $\lambda_{1.0/400,0}$;
a sheet thickness t of 0.03 mm to 0.3 mm; and
a ratio of a total thickness of the surface layers $t_1$ to t of from 0.10 to 0.70.

2. The multilayer electrical steel sheet according to 1., wherein at least one of the chemical composition of each of the surface layers or the chemical composition of the inner layer further contains, in mass %, B: 0.0001% to 0.0030%.

3. The multilayer electrical steel sheet according to 1. or 2., wherein at least one of the chemical composition of each of the surface layers or the chemical composition of the inner layer further contains, in mass %, at least one of Sn: 0.001% to 0.1% or Sb: 0.001% to 0.1%.

Advantageous Effect

According to this disclosure, it is possible to provide a multilayer electrical steel sheet having excellent elongation and both low high-frequency iron loss and high magnetic flux density. The multilayer electrical steel sheet of this disclosure has not only excellent magnetic properties but also excellent elongation, and thus, has excellent workability such as interlocking properties.

BRIEF DESCRIPTION OF THE DRAWINGS

In the accompanying drawings:

FIG. 1 is a schematic diagram illustrating the structure of a multilayer electrical steel sheet according to one of the embodiments of this disclosure;

DETAILED DESCRIPTION

Detailed description is given below. The following description merely presents examples of preferred embodiments of this disclosure, and this disclosure is not limited to these embodiments.

[Multilayer Electrical Steel Sheet]

Figure 2A:
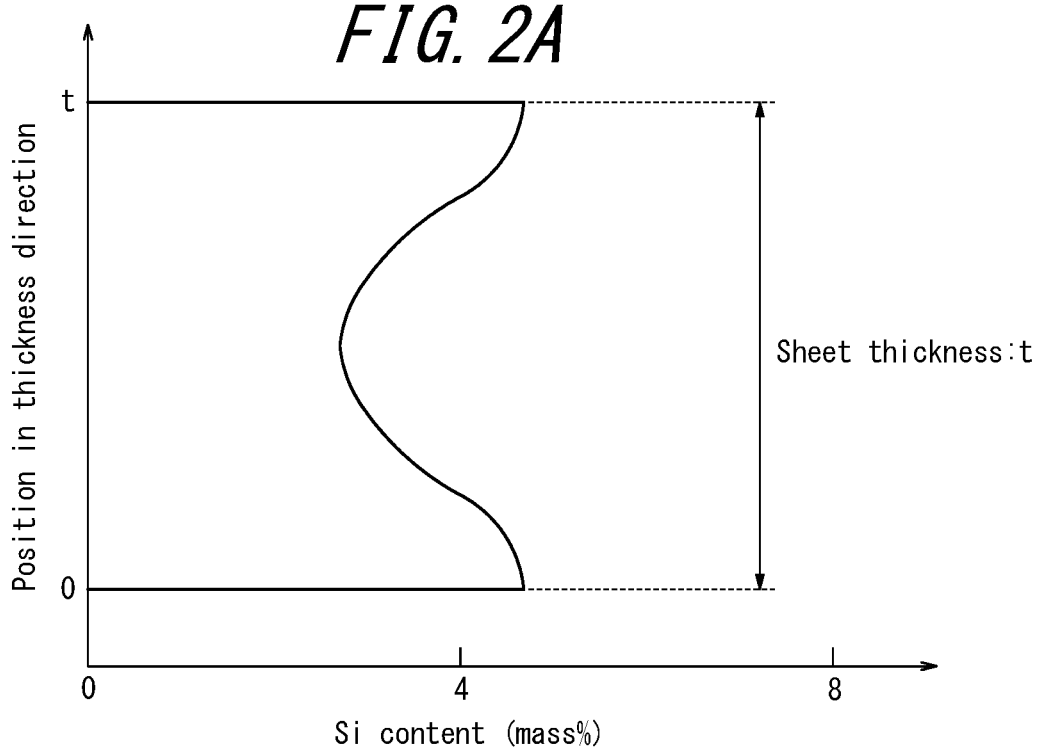
FIGS. 2A and 2B are schematic diagrams illustrating examples of the Si content profile in a thickness direction of the multilayer electrical steel sheet.
Figure 2B:
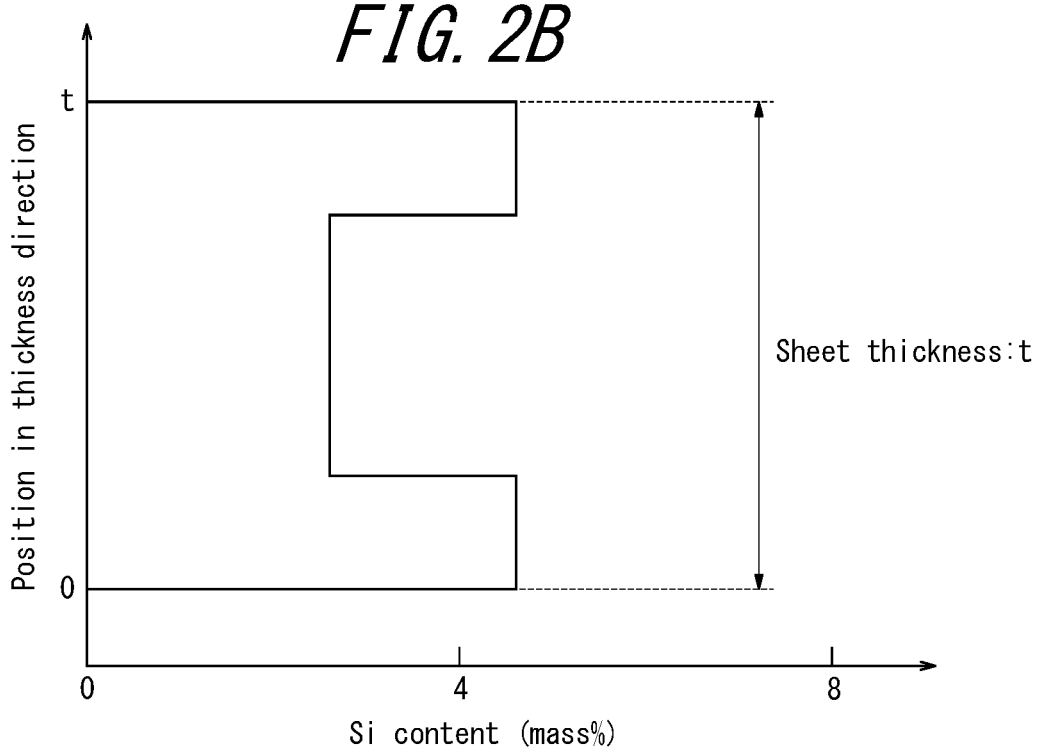

FIG. 1 is a schematic diagram illustrating the structure of a multilayer electrical steel sheet according to one of the embodiments of this disclosure. Further, FIGS. 2A and 2B are schematic diagrams illustrating examples of the Si content profile in a thickness direction of the multilayer electrical steel sheet. In FIGS. 2A and 2B, the vertical axis indicates a position in the thickness direction, 0 denotes one surface of the multilayer electrical steel sheet, and t denotes the other surface of the multilayer electrical steel sheet.

As illustrated in FIG. 1, a multilayer electrical steel sheet 1 of this disclosure (hereinafter, also referred to simply as "steel sheet") has an inner layer 10 and surface layers 20 provided on both sides of the inner layer 10, the inner layer 10 and the surface layers 20 having different Si contents. The Si content may change continuously (FIG. 2A) or stepwise (FIG. 2B) in the thickness direction of the steel sheet. When the Si content changes stepwise, it may change in two or more steps. In the following description, the "surface layers" indicate surface layers provided on the surfaces on both sides of the multilayer electrical steel sheet. Therefore, in this disclosure, both a first surface layer provided on one surface of the multilayer electrical steel sheet and a second surface layer provided on the other surface of the multilayer electrical steel sheet satisfy the conditions described below.

A part having a higher Si content than an average of Si contents over the total sheet thickness of the steel sheet is defined as a "surface layer" and a part having a lower Si content than the average is defined as an "inner layer". As described below, when the multilayer electrical steel sheet is manufactured by cladding two types of steel materials having different Si contents (high Si material and low Si material) with each other, typically, a part made of the high Si material is a surface layer and a part made of the low Si material is an inner layer. In this case, the Si content in each of the surface layers is substantially constant and the Si content in the inner layer is also substantially constant.

[Chemical Composition]

First, the chemical compositions of each of the surface layers and the inner layer are described. When components are expressed in "%", this refers to "mass %" unless otherwise stated.

[Chemical Composition of Surface Layers]

First, the chemical composition of each of the surface layers will be described. In this disclosure, both the first surface layer provided on one surface of the multilayer electrical steel sheet and the second surface layer provided on the other surface of the multilayer electrical steel sheet have the chemical composition described below. The chemical composition of the first surface layer and the chemical composition of the second surface layer may be typically the same but may be different from each other. Further, the content of an element in each of the surface layers indicates an average content of the element in each surface layer.

C: 0.001% to 0.01%

C is an element that segregates at grain boundaries to increase the grain boundary strength and improves the workability of the material. By adding C in an amount of 0.001% or more, the elongation becomes 10% or more and interlocking properties in fastening a motor core are improved. Therefore, the C content is set to 0.001% or more. On the other hand, a C content exceeding 0.01% increases iron loss due to magnetic aging. Therefore, the C content is set to 0.01% or less. As described above, a C content of 0.001% to 0.01% in each of the surface layers means that the average C content in the first surface layer is 0.001% to 0.01% and the average C content in the second surface layer is 0.001% to 0.01%. The average C content in the first surface layer may be the same with or different from the average C content in the second surface layer. The same definition applies to other elements.

Si: 2.5% to 6.0%

Si is an element having an effect of increasing the electrical resistance of the steel sheet and reducing eddy current loss. When the Si content in each of the surface layers ($[Si]_1$) is less than 2.5%, the eddy current loss cannot be effectively reduced. Therefore, the Si content in each of the surface layers is set to 2.5% or more, preferably 3.0% or more, and more preferably more than 3.5%. On the other hand, the Si content in each of the surface layers is more than 6.0%, the magnetic flux density decreases due to lower saturation magnetization. In addition, when the Si content in each of the surface layers is more than 6.0%, the steel becomes brittle, and the elongation is lowered even if the C content is within the above range. Therefore, the Si content in each of the surface layers is set to 6.0% or less, preferably less than 5.5%, and more preferably 5.0% or less.

Ti: 0.005% or Less

Ti, which is one of impurity elements, precipitates as TiC to thereby reduce the amount of C which segregates at grain boundaries, resulting in the decrease of the workability (elongation). Therefore, the Ti content is set to 0.005% or less, and preferably 0.002% or less. On the other hand, since lower Ti content is preferable, the lower limit of the Ti content is set to 0%. However, an excessive reduction of the Ti content results in an increase in costs, and thus the Ti content is preferably set to 0.0001% or more from the viewpoint of manufacturing costs.

In one embodiment of this disclosure, each of the surface layers has a chemical composition containing the above elements with the balance being Fe and inevitable impurities.

Further in another embodiment of this disclosure, the chemical composition of each of the surface layers may further contain B in an amount described below.

B: 0.0001% to 0.0030%

As with C, B is an element having an effect of increasing the grain boundary strength by segregating at grain boundaries, and further improving the workability (elongation) of the material. When B is added, to obtain this effect, the B content is set to 0.0001% or more, and preferably 0.0005% or more. On the other hand, a B content exceeding 0.0030% causes more BN precipitation, leading to an increase in iron loss. Therefore, the B content is set to 0.0030% or less, and preferably 0.0020% or less.

Further, in another embodiment of this disclosure, the chemical composition of each of the surface layers may further contain at least one of Sn or Sb in an amount described below.

Sn: 0.001% to 0.1%

Sn is an element having an effect of further improving the magnetic flux density through texture improvement. When Sn is added, to obtain this effect, the Sn content is set to 0.001% or more. On the other hand, a Sn content exceeding 0.1% causes saturation of the effect and unnecessarily increases the cost. Therefore, the Sn content is set to 0.1% or less.

Sb: 0.001% to 0.1%

As with Sn, Sb is an element having an effect of further improving the magnetic flux density. When Sb is added, to obtain this effect, the Sb content is set to 0.001% or more. On the other hand, a Sb content exceeding 0.1% causes saturation of the effect and unnecessarily increases the cost. Therefore, the Sb content is set to 0.1% or less.

Each of the surface layers according to one embodiment of this disclosure may have a chemical composition containing, in mass %,
C: 0.001% to 0.01%,
Si: 2.5% to 6.0%,
Ti: 0.005% or less,
optionally, B: 0.0001% to 0.0030%, and
optionally, at least one of Sn: 0.001% to 0.1% or Sb: 0.001% to 0.1% with the balance being Fe and inevitable impurities.

Further, each of the surface layers according to another embodiment of this disclosure may have a chemical composition containing, in mass %,
C: 0.001% to 0.01%,
Si: 2.5% to 6.0%,
Ti: 0.005% or less,
optionally, B: 0.0001% to 0.0030%,
optionally, at least one of Sn: 0.001% to 0.1% or Sb: 0.001% to 0.1% with the balance being Fe and inevitable impurities.

[Chemical Composition of Inner Layer]

Next, the chemical composition of the inner layer will be described. The content of an element in the inner layer indicates an average content of the element in the inner surface.

C: 0.001% to 0.01%

C is an element that segregates at grain boundaries to increase the grain boundary strength and improves the workability of the material. By adding C in an amount of 0.001% or more, the elongation becomes 10% or more and interlocking properties in fastening a motor core are improved. Therefore, the C content is set to 0.001% or more. On the other hand, a C content exceeding 0.01% increases iron loss due to magnetic aging. Therefore, the C content is set to 0.01% or less.

Si: 1.5% to 5.0%

A Si content in the inner layer ($[Si]_0$) of less than 1.5% causes an increase in high-frequency iron loss. Therefore, the Si content in the inner layer is set to 1.5% or more. On the other hand, a Si content in the inner layer of more than 5.0% causes cracking of a motor core in punching the core. In addition, when the Si content in the inner layer exceeds 5.0%, the steel becomes brittle. Thus, even if the C content is within the above range, the elongation is lowered. Therefore, the Si content in the inner layer is set to 5.0% or less. The Si content in the inner layer is preferably set to 4.0% or less and more preferably 2.8% or less.

Ti: 0.005% or Less

Ti, which is one of impurity elements, precipitates as TiC to thereby reduce the amount of C which segregates at grain boundaries, resulting in the decrease of the workability. Therefore, the Ti content is set to 0.005% or less, and preferably 0.002% or less. On the other hand, since the Ti content is preferable as low as possible, the lower limit of the Ti content is set to 0%. However, an excessive reduction of the Ti content results in an increase in costs, and thus the Ti content is preferably 0.0001% or more from the viewpoint of manufacturing costs.

In one embodiment of this disclosure, the inner layer has a chemical composition containing the above elements with the balance being Fe and inevitable impurities.

Further, in another embodiment of this disclosure, the chemical composition of the inner layer may further contain B in an amount described below.

B: 0.0001% to 0.0030%

As with C, B is an element having an effect of increasing the grain boundary strength by segregating at grain boundaries, and further improving the workability of the material. When B is added, to obtain this effect, the B content is set to 0.0001% or more, and preferably 0.0005% or more. On the other hand, a B content exceeding 0.0030% causes more BN precipitation, leading to an increase in iron loss. Therefore, the B content is set to 0.0030% or less, and preferably 0.0020% or less.

Further, in another embodiment of this disclosure, the chemical composition of the inner layer may further contain at least one of Sn or Sb in an amount described below.

Sn: 0.001% to 0.1%

Sn is an element having an effect of further improving the magnetic flux density through texture improvement. When Sn is added, to obtain this effect, the Sn content is set to 0.001% or more. On the other hand, a Sn content exceeding 0.1% causes saturation of the effect and unnecessarily increases the cost. Therefore, the Sn content is set to 0.1% or less.

Sb: 0.001% to 0.1%

As with Sn, Sb is an element having an effect of further improving the magnetic flux density. When Sb is added, to obtain this effect, the Sb content is set to 0.001% or more. On the other hand, a Sb content exceeding 0.1% causes saturation of the effect and unnecessarily increases the cost. Therefore, the Sb content is set to 0.1% or less.

The inner layer according to one embodiment of this disclosure may have a chemical composition containing, in mass %,
C: 0.001% to 0.01%,
Si: 1.5% to 5.0%,
Ti: 0.005% or less,
optionally, B: 0.0001% to 0.0030%, and
optionally, at least one of Sn: 0.001% to 0.1% or Sb: 0.001% to 0.1% with the balance being Fe and inevitable impurities.

Further, the inner layer according to another embodiment of this disclosure may have a chemical composition containing, in mass %,
C: 0.001% to 0.01%,
Si: 1.5% to 5.0%,
Ti: 0.005% or less,
optionally, B: 0.0001% to 0.0030%,
optionally, at least one of Sn: 0.001% to 0.1% or Sb: 0.001% to 0.1% with the balance being Fe and inevitable impurities.

[Difference in Si Content]

To examine the effect of the difference in Si content ($\Delta Si$) between the surface layers and the inner layer on the magnetic properties, multilayer electrical steel sheets having different $\Delta Si$ were manufactured by the following procedures and the magnetic properties were evaluated.

First, steel for the surface layers was attached to both surfaces of steel for the inner layer so that the ratio of the thickness of the surface layers to the sheet thickness (total thickness) of the multilayer electrical steel sheet was 0.30 and subjected to hot rolling to obtain a hot-rolled steel sheet. Each of the steel for the surface layers and the steel for the inner layer was melted so as to obtain a desired chemical composition to prepare an ingot. The Si content in the inner layer $[Si]_0$ was set to 2.5% and the Si content in each of the surface layers $[Si]_1$ was changed in the range of 2.5% to 6.5%. The C content was set to 0.0040% in both the surface layers and the inner layer. The Ti content was set to 0.001% in both the surface layers and the inner layer. The chemical compositions of each of the surface layers and the inner layer had the balance of Fe and inevitable impurities. The surface layers on both surfaces had the same chemical composition.

After the hot rolling, the hot-rolled steel sheet was subjected to hot-rolled sheet annealing of 900° C.×30 s, followed by cold rolling to obtain a cold-rolled steel sheet having a sheet thickness of 0.10 mm. Subsequently, the cold-rolled steel sheet was subjected to final annealing of 1000° C.×30 s to obtain a multilayer electrical steel sheet.

A test piece having a width of 30 mm and a length of 180 mm was collected from the obtained multilayer electrical steel sheet and subjected to the Epstein test to evaluate the magnetic properties. In the Epstein test, an L-direction test piece collected so that the length direction of the test piece was parallel to the rolling direction (L direction) and a C-direction test piece collected so that the length direction of the test piece was parallel to the direction orthogonal to the rolling direction (C direction) were used in equal amounts to measure the averages of the magnetic properties in the L direction and the C direction.

Figure 3:
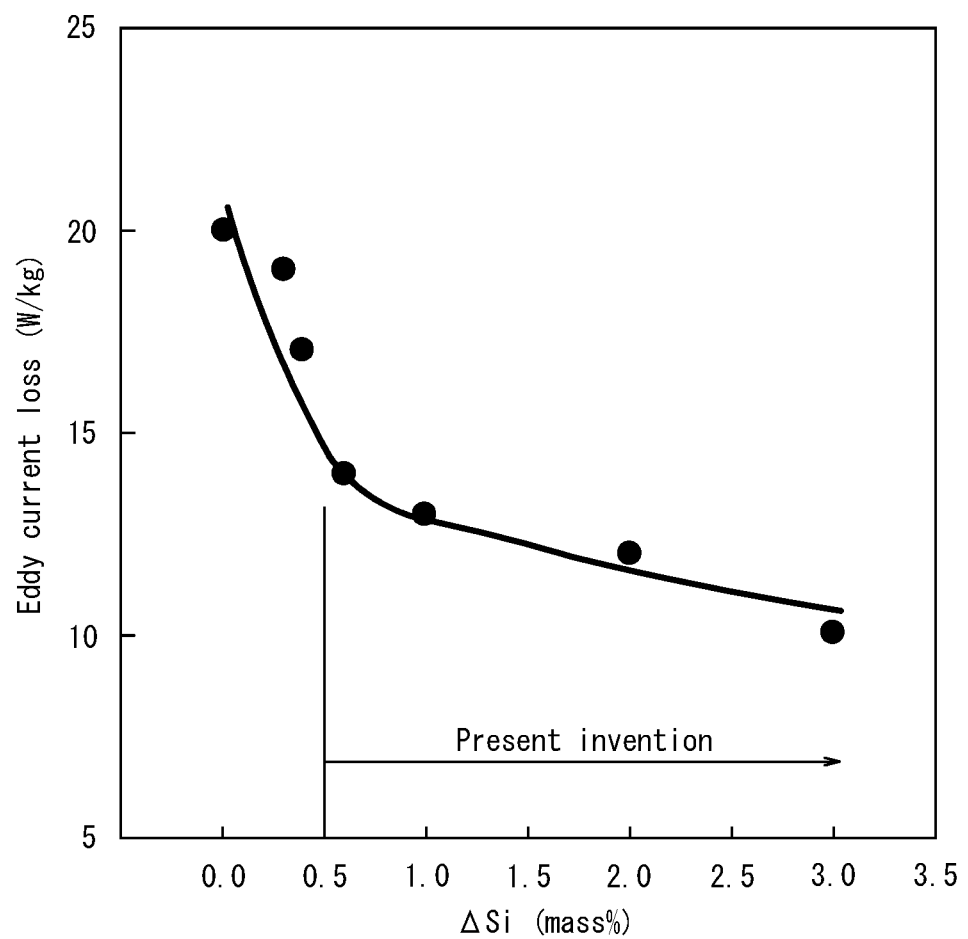
FIG. 3 is a graph illustrating a correlation between the difference in Si content between surface layers and an inner layer ($\Delta$Si) and the eddy current loss.

FIG. 3 indicates a correlation between ΔSi (mass %) and the eddy current loss at 1.0 T and 1 kHz, ΔSi being defined as a difference in Si content between each of the surface layers and the inner layer ($[Si]_1-[Si]_0$). From the result, it is found that when ΔSi is 0.5 mass % or more, the eddy current loss is significantly reduced. This is because the Si content in each of the surface layers is higher than that in the inner layer, and as a result, the magnetic permeability of each of the surface layers is higher than that of the inner layer, thus leading to the concentration of magnetic fluxes to the surface layer. Since a part having concentrated magnetic fluxes has high specific resistance, the eddy current loss can be effectively reduced.

For the above reason, in this disclosure, ΔSi defined as a difference between the Si content in each of the surface layers and the Si content in the inner layer ($[Si]_1-[Si]_0$) is set to 0.5 mass % or more, and preferably 1.0 mass % or more. On the other hand, no upper limit is placed on ΔSi, but ΔSi may be typically 4.5% or less. From the viewpoint of further reducing the magnetostriction, ΔSi is preferably set to 2.9 mass % or less.

[Difference in Magnetostriction]

To examine the effect of the difference in magnetostriction between the surface layers and the inner layer ($\Delta\lambda_{1.0/400}$) on the magnetic properties, multilayer electrical steel sheets having different $\Delta\lambda_{1.0/400}$ were manufactured by the following procedures and the magnetic properties were evaluated.

First, steel for the surface layers was attached to both surfaces of steel for the inner layer so that the ratio of the thickness of the surface layers to the sheet thickness (total thickness) of the multilayer electrical steel sheet was 0.30 and subjected to hot rolling to obtain a hot-rolled steel sheet. Each of the steel for the surface layers and the steel for the inner layer was melted so as to obtain a desired chemical composition to prepare an ingot. The Si content in the inner layer $[Si]_0$ was set to 2.5% and the Si content in each of the surface layers $[Si]_1$ was changed in the range of 2.5% to 7.0%. The C content in each of the surface layers was set to 0.0035% and the C content in the inner layer was set to 0.0030%. On the other hand, the Ti content was set to 0.001% in both the surface layers and the inner layer. The chemical compositions of each of the surface layers and the inner layer had the balance of Fe and inevitable impurities. The surface layers on both surfaces had the same chemical composition.

After the hot rolling, the hot-rolled steel sheet was subjected to hot-rolled sheet annealing of 900° C.×30 s, followed by cold rolling to obtain a cold-rolled steel sheet having a sheet thickness of 0.20 mm. Subsequently, the cold-rolled steel sheet was subjected to final annealing of 1000° C.×30 s to obtain a multilayer electrical steel sheet.

A test piece having a width of 30 mm and a length of 180 mm was collected from the obtained multilayer electrical steel sheet and subjected to the Epstein test to evaluate the magnetic properties. In the Epstein test, an L-direction test piece collected so that the length direction of the test piece was parallel to the rolling direction (L direction) and a C-direction test piece collected so that the length direction of the test piece was parallel to the direction orthogonal to the rolling direction (C direction) were used in equal amounts to measure the averages of the magnetic properties in the L direction and the C direction. For the measurement of the magnetostriction, a laser doppler displacement meter was used to measure the peak to peak value of the magnetostriction at a magnetic flux density of 1.0 T and a frequency of 400 Hz.

Figure 4:
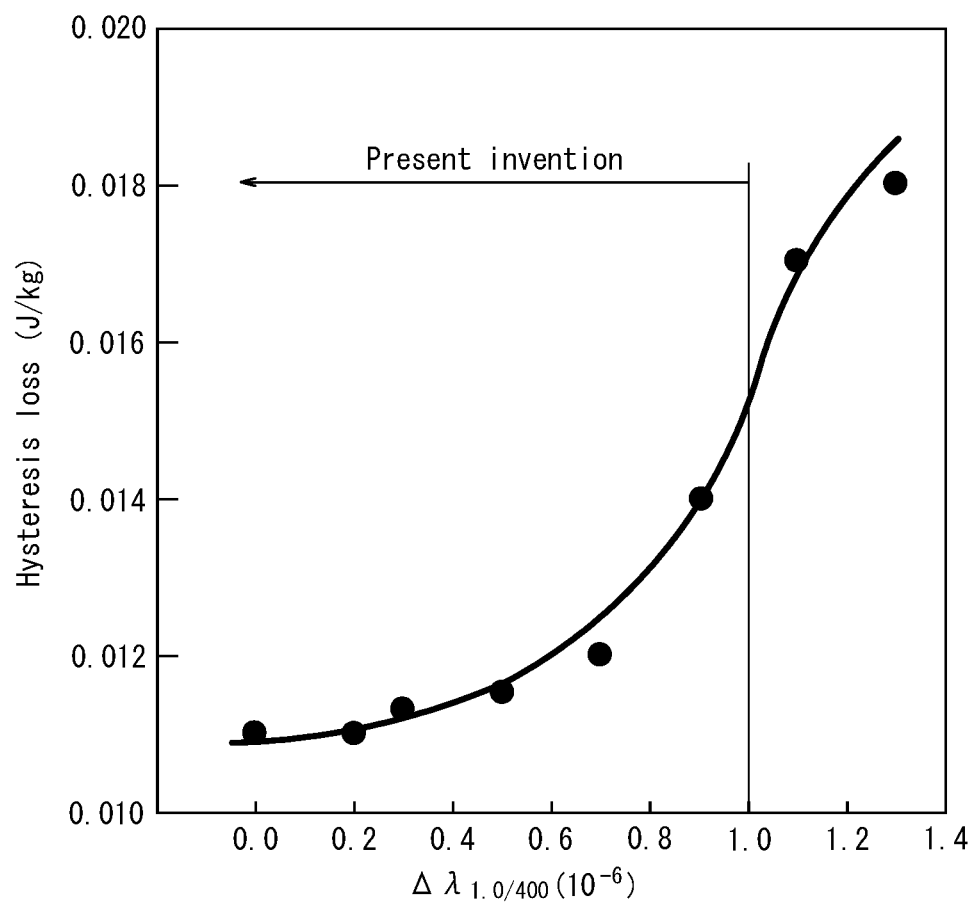
FIG. 4 is a graph illustrating a correlation between the difference in magnetostriction between the surface layers and the inner layer ($\Delta\lambda_{1.0/400}$) and the hysteresis loss.

FIG. 4 indicates a correlation between the difference in magnetostriction between the surface layers and the inner layer ($\Delta\lambda_{1.0/400}$) and the hysteresis loss (excitation to 1.0 T). From the result, it is found that when $\Delta\lambda_{1.0/400}$ is $1.0\times10^{-6}$ or less, the hysteresis loss is significantly lowered. This is because when the difference in magnetostriction between the surface layers and the inner layer is large, the internal stress is caused by the difference in magnetostriction between the surface layers and the inner layer in magnetizing the steel sheet.

For the above reason, the absolute value represented by $\Delta\lambda_{1.0/400}$ of the difference between the magnetostriction of each of the surface layers $\lambda_{1.0/400,1}$ and the magnetostriction of the inner layer $\lambda_{1.0/400,0}$ is set to $1.0\times10^{-6}$ or less, and preferably $0.5\times10^{-6}$ or less. When the magnetostriction of the inner layer is larger than that of the surface layer, the internal stress during magnetization becomes large and the hysteresis loss is increased. Therefore, the absolute value of the difference in magnetostriction is used as $\Delta\lambda_{1.0/400}$.

[Sheet Thickness]

When the sheet thickness of the multilayer electrical steel sheet t is less than 0.03 mm, cold rolling and annealing in manufacturing the multilayer electrical steel sheet are difficult, significantly increasing costs. Therefore, t is set to 0.03 mm or more. On the other hand, when t is more than 0.3 mm, the eddy current loss is increased, leading to an increase in the total iron loss. Therefore, t is set to 0.3 mm or less.

[Multilayer Ratio]

To examine the effect of the ratio of the total thickness of the surface layers $t_1$ to the sheet thickness of the multilayer electrical steel sheet t (tilt) (hereinafter, also referred to as "multilayer ratio") on the magnetic properties, multilayer electrical steel sheets having different multilayer ratios were manufactured by the following procedures and the magnetic properties were evaluated. The "total thickness of the surface layers" indicates the sum of the thicknesses of the surface layers provided on both sides.

First, steel for the surface layers was attached to both surfaces of steel for the inner layer so as to obtain a predetermined multilayer ratio and subjected to hot rolling to obtain a hot-rolled steel sheet. Each of the steel for the surface layers and the steel for the inner layer was melted so as to obtain a desired chemical composition to prepare an ingot. The Si content in the inner layer $[Si]_0$ was set to 1.9% and the Si content in each of the surface layers $[Si]_1$ was set to 2.5%. The C content was set to 0.0035% in both the surface layers and the inner layer. The Ti content was set to 0.001% in both the surface layers and the inner layer. The chemical compositions of each of the surface layers and the inner layer had the balance of Fe and inevitable impurities. The surface layers on both surfaces had the same chemical composition.

After the hot rolling, the hot-rolled steel sheet was subjected to hot-rolled sheet annealing of 900° C.×30 s, followed by cold rolling to obtain a cold-rolled steel sheet having a sheet thickness of 0.20 mm. Subsequently, the cold-rolled sheet was subjected to final annealing of 1000° C.×30 s to obtain a multilayer electrical steel sheet.

Figure 5:
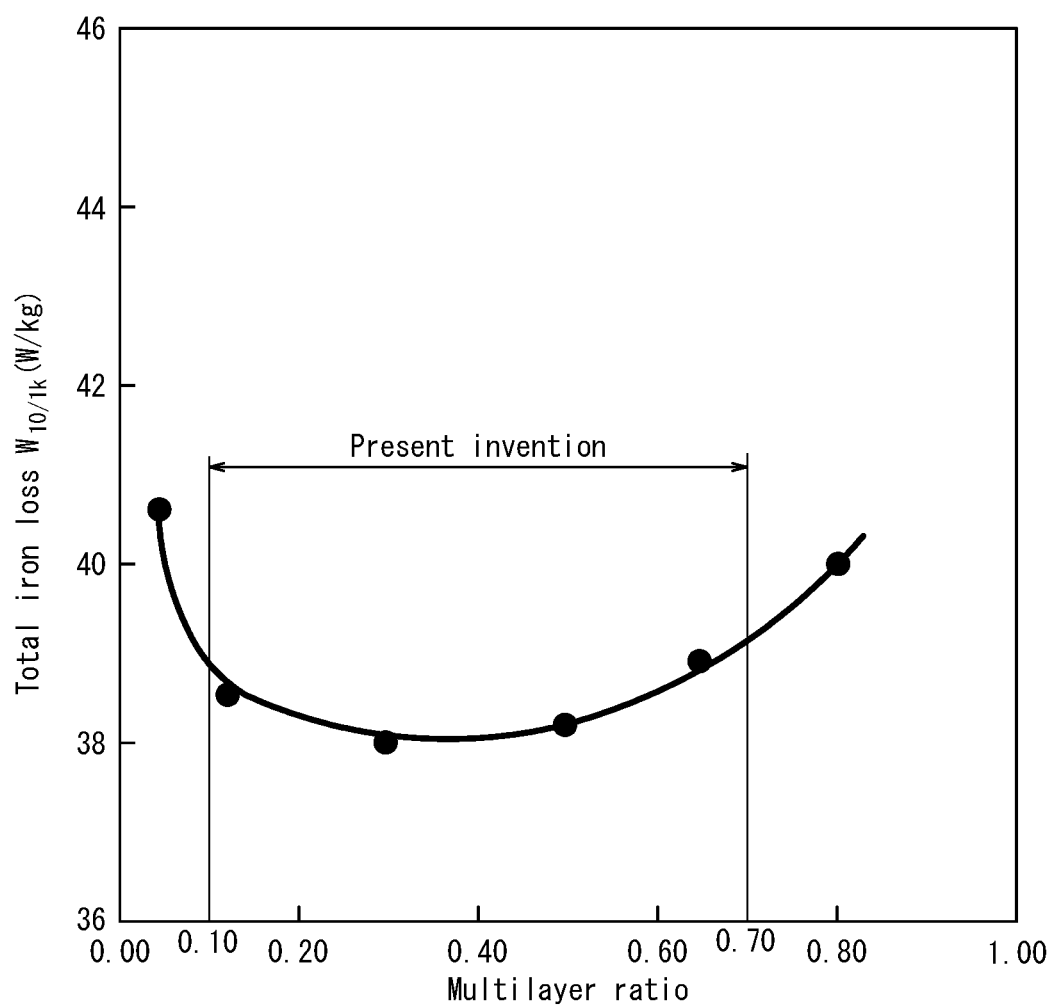
FIG. 5 is a graph illustrating a correlation between the multilayer ratio defined as a ratio of a total thickness of the surface layers $t_1$ to the sheet thickness of the multilayer electrical steel sheet t and the total iron loss.

FIG. 5 indicates a correlation between the multilayer ratio and the total iron loss ($W_{10/1k}$). From the result, it is found that when the multilayer ratio is from 0.10 to 0.70, the iron loss is reduced. The reduction in the iron loss is believed to be because of the following reasons. First, when the ratio of the surface layers which have high resistance is less than 0.10, the eddy current which concentrates on the surface layers cannot be effectively reduced. On the other hand, since the difference in magnetic permeability between the surface layers and the inner layer is small when the ratio of the surface layers is more than 0.70, the magnetic flux penetrates to the inner surface and the eddy current loss also occurs from the inner surface. Therefore, the iron loss can be reduced by setting the multilayer ratio in a range of from 0.10 to 0.70.

[Manufacturing Method]

The method of manufacturing the multilayer electrical steel sheet of this disclosure is not particularly limited and may be any method. Examples of the manufacturing method include a method of cladding steel raw materials having different Si contents. The chemical compositions of the steel raw materials can be adjusted by, for example, blowing materials having different compositions in a converter to obtain molten steel and subjecting the molten steel to degassing treatment.

The cladding method is not particularly limited. However, for example, steel slabs having different Si contents may be prepared and a steel slab for the surface layers may be attached, with a thickness such that the eventual multilayer ratio is a desired value, to both surfaces of a steel slab for the inner layer and subjected to rolling. The rolling may be, for example, at least one selected from the group consisting of hot rolling, warm rolling, and cold rolling. In general, the combination of hot rolling and subsequent warm rolling or the combination of hot rolling and subsequent cold rolling is preferable. After the hot rolling, hot-rolled sheet annealing is preferably performed. Further, the warm rolling and cold rolling may be performed twice or more with intermediate annealing performed therebetween. The rolling finish temperature and the coiling temperature during the hot rolling are not particularly limited and may be determined according to the conventional method. After the rolling, final annealing is performed. The multilayer electrical steel sheet obtained by cladding the steel materials having different Si contents has the Si content profile as illustrated in, for example, FIG. 2B.

As another manufacturing method, siliconizing treatment may be used. When the siliconizing treatment is used, by subjecting a steel sheet having a constant Si content in the thickness direction to siliconizing treatment, the Si content in the surface layers on both sides of the steel sheet can be increased. The method of the siliconizing treatment is not particularly limited and may be any method. For example, a method in which Si is deposited on the surfaces of the steel sheet by a chemical vapor deposition method (CVD method) and subsequently heat treatment is performed to diffuse Si to the inside of the steel sheet can be used. The Si contents of the surface layers and the inner layer can be controlled by adjusting the amount of Si deposited by the CVD method and heat treatment conditions. The multilayer electrical steel sheet obtained by the siliconizing treatment has the Si content profile as illustrated in, for example, FIG. 2A.

EXAMPLES

To determine the effect of this disclosure, multilayer electrical steel sheets were manufactured in the following procedures and their magnetic properties and elongation were evaluated.

First, for each multilayer electrical steel sheet, two types of steel slabs for a surface layer and an inner layer having the chemical composition listed in Table 1 were prepared. Next, the steel slab for a surface layer was stacked on both sides of the steel slab for an inner layer. The outer periphery of the stacked steel slabs was welded. Therefore, the surface layers on both sides had the same chemical composition. The chemical compositions of the steel slabs were adjusted by blowing the steel slabs in a converter and subsequently subjecting them to degassing treatment. The chemical compositions were maintained in the resulting multilayer electrical steel sheet.

Next, the stacked steel slabs were heated at 1140° C. for 1 hr, and subsequently hot rolled to obtain a hot-rolled steel sheet having a sheet thickness of 2.0 mm. The hot rolling finish temperature in the hot rolling was set to 800° C. Then, the hot-rolled steel sheet was coiled at a coiling temperature of 610° C., and then subjected to hot-rolled sheet annealing of 900° C.×30 s. Subsequently, the hot-rolled steel sheet was subjected to pickling and cold rolling, followed by annealing at a final annealing temperature listed in Table 2 to obtain a multilayer electrical steel sheet. The sheet thickness of the resulting multilayer electrical steel sheet t and a ratio of a total thickness of the surface layers $t_1$ to t (i.e., a multilayer ratio) were as listed in Table 2.

For comparison, normal electrical steel sheets without cladding were subjected to the same test (Nos. 1 and 2). These electrical steel sheets as comparative examples had the same chemical composition in the surface layers and the inner layer.

Further, the multilayer electrical steel sheet of No. 47 was manufactured by a siliconizing method. Specifically, a cold-rolled steel sheet having a Si content of 2.5% and a sheet thickness of 0.2 mm was subjected to siliconizing treatment at 1200° C. The average of Si contents over the total sheet thickness of the steel sheet was calculated. A part having a higher Si concentration than the average was defined as a surface layer and a part having a lower Si concentration than the average was defined as an inner layer. The Si content in each of the surface layers was an average of Si contents in the surface layer. Further, listed as the magnetostriction measurements of the surface layers and the inner layer are the magnetostriction measurements of a steel sheet having the same Si content as the average of Si contents and the same chemical composition as that of the multilayer electrical steel sheet of No. 47 except for the Si content.

(Magnetostriction)

To measure the magnetostriction in the surface layers and the inner layer, steel slabs corresponding to the surface layers and the inner layer were not attached to each other, and subjected to hot rolling, hot-rolled sheet annealing, cold rolling, and final annealing in a similar way to the above procedures to obtain steel sheets having a sheet thickness of 0.1 mm. Next, each of the obtained steel sheets was measured for the magnetostriction in the rolling direction. The measurement results are as listed in Table 2. For the measurement of the magnetostriction, a laser doppler displacement meter was used to measure the peak to peak value of the magnetostriction at a magnetic flux density of 1.0 T and a frequency of 400 Hz.

(Magnetic Properties)

Next, each of the obtained multilayer electrical steel sheets was measured for its magnetic properties. The measurement of the magnetic properties was performed using a 25 cm Epstein frame according to JIS C 2550-1. As the magnetic properties, the iron loss at 1.0 T and 1 kHz represented by $W_{10/1k}$ (W/kg) and the magnetic flux density at a magnetizing force of 5000 A/m represented by $B_{50}$ were measured. The measurement results are as listed in Table 1.

(Elongation)

In addition, each of the obtained multilayer electrical steel sheets was measured for its elongation. In the measurement of the elongation, a JIS No. 5 tensile test piece cut out from the multilayer electrical steel sheet was used and the total elongation at fracture El (%) was measured based on JIS Z 2241.

As can be seen from the results of Tables 1 and 2, the multilayer electrical steel sheets of our examples satisfying the conditions of this disclosure had excellent magnetic properties, i.e., low high-frequency iron loss and high magnetic flux density. In addition, the multilayer electrical steel sheets of our examples had excellent elongation, and thus, excellent workability such as interlocking properties. Therefore, the multilayer electrical steel sheets according to this disclosure can be extremely suitably used as motor cores of hybrid electric vehicles, electric vehicles, cleaners, high speed power generators, air compressors, machine tools, and the like which are driven at high frequencies, and further as core materials of transformers, reactors, and the like.

TABLE 1

| | Chemical composition (mass %) | | | | | | | | | | | | |
|---|---|---|---|---|---|---|---|---|---|---|---|---|---|
| | Surface layer* | | | | | | Inner layer* | | | | | | |
| No. | C | Si | Ti | Sn | Sb | B | C | Si | Ti | Sn | Sb | B | ΔSi |
| 1 | 0.0035 | 2.5 | 0.0010 | 0.0010 | 0.0010 | 0.00003 | 0.0035 | 2.50 | 0.0010 | 0.0010 | 0.0010 | 0.00003 | 0.00 |
| 2 | 0.0032 | 5.5 | 0.0010 | 0.0010 | 0.0010 | 0.00003 | 0.0032 | 5.50 | 0.0010 | 0.0010 | 0.0010 | 0.00003 | 0.00 |
| 3 | 0.0036 | 6.0 | 0.0010 | 0.0010 | 0.0010 | 0.00003 | 0.0036 | 3.50 | 0.0010 | 0.0010 | 0.0010 | 0.00003 | 2.50 |
| 4 | 0.0031 | 4.0 | 0.0010 | 0.0010 | 0.0010 | 0.00003 | 0.0031 | 3.50 | 0.0005 | 0.0010 | 0.0010 | 0.00003 | 0.50 |
| 5 | 0.0031 | 4.0 | 0.0010 | 0.0010 | 0.0010 | 0.00003 | 0.0031 | 2.50 | 0.0005 | 0.0010 | 0.0010 | 0.00003 | 1.50 |
| 6 | 0.0029 | 4.3 | 0.0010 | — | — | — | 0.0029 | 2.30 | 0.0005 | — | — | — | 2.00 |
| 7 | 0.0032 | 3.9 | 0.0010 | 0.0020 | — | — | 0.0032 | 2.30 | 0.0010 | 0.0020 | — | — | 1.60 |
| 8 | 0.0033 | 4.2 | 0.0010 | — | 0.0020 | — | 0.0033 | 2.30 | 0.0010 | — | 0.0020 | — | 1.90 |
| 9 | 0.0035 | 3.8 | 0.0010 | — | — | 0.00030 | 0.0035 | 2.40 | 0.0010 | — | — | 0.00030 | 1.40 |
| 10 | 0.0030 | 4.1 | 0.0010 | 0.0050 | 0.0020 | — | 0.0030 | 2.30 | 0.0030 | 0.0050 | 0.0020 | — | 1.80 |
| 11 | 0.0042 | 4.4 | 0.0010 | 0.0010 | 0.0010 | 0.00003 | 0.0042 | 2.50 | 0.0010 | 0.0010 | 0.0010 | 0.00003 | 1.90 |
| 12 | 0.0042 | 5.1 | 0.0010 | — | — | — | 0.0042 | 2.50 | 0.0010 | — | — | — | 2.60 |
| 13 | 0.0042 | 5.1 | 0.0010 | 0.0010 | 0.0010 | 0.00003 | 0.0042 | 2.50 | 0.0010 | 0.0010 | 0.0010 | 0.00003 | 2.60 |
| 14 | 0.0041 | 5.5 | 0.0010 | 0.0010 | 0.0010 | 0.00003 | 0.0041 | 2.50 | 0.0010 | 0.0010 | 0.0010 | 0.00003 | 3.00 |
| 15 | 0.0041 | 4.0 | 0.0010 | 0.0010 | 0.0010 | 0.00003 | 0.0041 | 1.20 | 0.0010 | 0.0010 | 0.0010 | 0.00003 | 2.80 |
| 16 | 0.0036 | 4.0 | 0.0010 | — | — | — | 0.0036 | 2.00 | 0.0010 | — | — | — | 2.00 |
| 17 | 0.0036 | 4.0 | 0.0001 | 0.0010 | 0.0010 | 0.00003 | 0.0036 | 2.00 | 0.0001 | 0.0010 | 0.0010 | 0.00003 | 2.00 |
| 18 | 0.0035 | 4.0 | 0.0001 | 0.0010 | 0.0010 | 0.00003 | 0.0035 | 3.00 | 0.0001 | 0.0010 | 0.0010 | 0.00003 | 1.00 |
| 19 | 0.0034 | 4.0 | 0.0010 | 0.0010 | 0.0010 | 0.00003 | 0.0034 | 3.60 | 0.0010 | 0.0010 | 0.0010 | 0.00003 | 0.40 |
| 20 | 0.0004 | 4.2 | 0.0010 | 0.0010 | 0.0010 | 0.00003 | 0.0004 | 2.50 | 0.0010 | 0.0010 | 0.0010 | 0.00003 | 1.70 |
| 21 | 0.0015 | 4.2 | 0.0010 | 0.0010 | 0.0010 | 0.00003 | 0.0015 | 2.51 | 0.0010 | 0.0010 | 0.0010 | 0.00003 | 1.69 |
| 22 | 0.0015 | 4.2 | 0.0010 | — | — | — | 0.0015 | 2.51 | 0.0010 | — | — | — | 1.69 |
| 23 | 0.0050 | 4.2 | 0.0010 | 0.0010 | 0.0010 | 0.00003 | 0.0050 | 2.49 | 0.0010 | 0.0010 | 0.0010 | 0.00003 | 1.71 |
| 24 | 0.0090 | 4.2 | 0.0010 | 0.0010 | 0.0010 | 0.00003 | 0.0085 | 2.50 | 0.0010 | 0.0010 | 0.0010 | 0.00003 | 1.70 |
| 25 | 0.0150 | 4.1 | 0.0010 | 0.0010 | 0.0010 | 0.00003 | 0.0150 | 2.50 | 0.0010 | 0.0010 | 0.0010 | 0.00003 | 1.60 |
| 26 | 0.0020 | 4.0 | 0.0040 | 0.0010 | 0.0010 | 0.00003 | 0.0020 | 2.49 | 0.0040 | 0.0010 | 0.0010 | 0.00003 | 1.51 |
| 27 | 0.0020 | 4.0 | 0.0070 | 0.0010 | 0.0010 | 0.00003 | 0.0020 | 2.48 | 0.0070 | 0.0010 | 0.0010 | 0.00003 | 1.52 |
| 28 | 0.0020 | 4.4 | 0.0010 | 0.0010 | 0.0010 | 0.00004 | 0.0020 | 2.52 | 0.0010 | 0.0010 | 0.0010 | 0.00004 | 1.88 |
| 29 | 0.0020 | 4.4 | 0.0010 | 0.0010 | 0.0010 | 0.00020 | 0.0020 | 2.52 | 0.0010 | 0.0010 | 0.0010 | 0.00020 | 1.88 |
| 30 | 0.0020 | 4.4 | 0.0010 | 0.0010 | 0.0010 | 0.00150 | 0.0020 | 2.52 | 0.0010 | 0.0010 | 0.0010 | 0.00150 | 1.88 |
| 31 | 0.0020 | 4.4 | 0.0010 | 0.0010 | 0.0010 | 0.00300 | 0.0020 | 2.50 | 0.0010 | 0.0010 | 0.0010 | 0.00300 | 1.90 |
| 32 | 0.0020 | 4.4 | 0.0010 | 0.0010 | 0.0010 | 0.00400 | 0.0020 | 2.51 | 0.0010 | 0.0010 | 0.0010 | 0.00400 | 1.89 |
| 33 | 0.0036 | 4.2 | 0.0010 | 0.0020 | 0.0010 | 0.00010 | 0.0036 | 2.20 | 0.0010 | 0.0020 | 0.0010 | 0.00010 | 2.00 |
| 34 | 0.0040 | 4.2 | 0.0010 | 0.0500 | 0.0010 | 0.00010 | 0.0040 | 2.20 | 0.0010 | 0.0500 | 0.0010 | 0.00010 | 2.00 |
| 35 | 0.0041 | 4.2 | 0.0010 | 0.0010 | 0.0100 | 0.00010 | 0.0041 | 2.20 | 0.0010 | 0.0010 | 0.0100 | 0.00010 | 2.00 |
| 36 | 0.0042 | 4.2 | 0.0010 | 0.0010 | 0.0700 | 0.00010 | 0.0042 | 2.20 | 0.0010 | 0.0010 | 0.0700 | 0.00010 | 2.00 |
| 37 | 0.0039 | 3.5 | 0.0010 | 0.0010 | 0.0010 | 0.00010 | 0.0039 | 2.00 | 0.0010 | 0.0010 | 0.0010 | 0.00010 | 1.50 |
| 38 | 0.0035 | 3.5 | 0.0010 | 0.0010 | 0.0010 | 0.00010 | 0.0035 | 2.00 | 0.0010 | 0.0010 | 0.0010 | 0.00010 | 1.50 |
| 39 | 0.0038 | 3.5 | 0.0010 | 0.0010 | 0.0010 | 0.00010 | 0.0038 | 2.00 | 0.0010 | 0.0010 | 0.0010 | 0.00010 | 1.50 |
| 40 | 0.0038 | 3.5 | 0.0010 | 0.0010 | 0.0010 | 0.00010 | 0.0038 | 2.00 | 0.0010 | 0.0010 | 0.0010 | 0.00010 | 1.50 |
| 41 | 0.0038 | 2.9 | 0.0010 | 0.0010 | 0.0010 | 0.00010 | 0.0038 | 1.90 | 0.0010 | 0.0010 | 0.0010 | 0.00010 | 1.00 |
| 42 | 0.0038 | 2.8 | 0.0010 | 0.0010 | 0.0010 | 0.00010 | 0.0038 | 2.00 | 0.0010 | 0.0010 | 0.0010 | 0.00010 | 1.00 |
| 43 | 0.0029 | 2.0 | 0.0010 | 0.0010 | 0.0010 | 0.00010 | 0.0029 | 1.50 | 0.0010 | 0.0010 | 0.0010 | 0.00010 | 0.50 |
| 44 | 0.0026 | 3.5 | 0.0010 | 0.0010 | 0.0010 | 0.00010 | 0.0026 | 2.00 | 0.0010 | 0.0010 | 0.0010 | 0.00010 | 1.50 |
| 45 | 0.0030 | 4.9 | 0.0010 | 0.0010 | 0.0010 | 0.00010 | 0.0030 | 2.00 | 0.0010 | 0.0010 | 0.0010 | 0.00010 | 2.90 |

TABLE 1-continued

| | Chemical composition (mass %) | | | | | | | | | | | | |
|---|---|---|---|---|---|---|---|---|---|---|---|---|---|
| | Surface layer* | | | | | | Inner layer* | | | | | | |
| No. | C | Si | Ti | Sn | Sb | B | C | Si | Ti | Sn | Sb | B | ΔSi |
| 46 | 0.0041 | 5.5 | 0.0010 | 0.0010 | 0.0010 | 0.00010 | 0.0041 | 4.50 | 0.0010 | 0.0010 | 0.0010 | 0.00010 | 1.00 |
| 47 | 0.0060 | <u>6.5</u> | 0.0010 | 0.0010 | 0.0010 | 0.00010 | 0.0060 | 5.00 | 0.0010 | 0.0010 | 0.0010 | 0.00010 | 1.50 |
| 48 | 0.0032 | 3.5 | 0.0010 | 0.0010 | 0.0010 | 0.00010 | 0.0032 | <u>1.20</u> | 0.0010 | 0.0010 | 0.0010 | 0.00010 | 2.30 |
| 49 | 0.0031 | 4.0 | 0.0010 | 0.0010 | 0.0010 | 0.00010 | 0.0031 | 3.00 | 0.0010 | 0.0010 | 0.0010 | 0.00010 | 1.00 |
| 50 | 0.0032 | 5.0 | 0.0010 | 0.0010 | 0.0010 | 0.00010 | 0.0032 | 4.00 | 0.0010 | 0.0010 | 0.0010 | 0.00010 | 1.00 |
| 51 | 0.0030 | 6.0 | 0.0010 | 0.0010 | 0.0010 | 0.00010 | 0.0030 | <u>5.50</u> | 0.0010 | 0.0010 | 0.0010 | 0.00010 | 0.50 |
| 52 | 0.0036 | 4.0 | 0.0010 | 0.0010 | 0.0010 | 0.00010 | 0.0036 | 2.50 | 0.0010 | 0.0010 | 0.0010 | 0.00010 | 1.50 |
| 53 | 0.0029 | 4.1 | 0.0010 | 0.0100 | 0.0010 | 0.00010 | 0.0029 | 2.50 | 0.0010 | 0.0100 | 0.0010 | 0.00010 | 1.60 |
| 54 | 0.0032 | 4.0 | 0.0010 | 0.0100 | 0.0010 | 0.00010 | 0.0032 | 2.49 | 0.0010 | 0.0100 | 0.0010 | 0.00010 | 1.51 |
| 55 | 0.0032 | 5.5 | 0.0010 | 0.0100 | 0.0010 | 0.00010 | 0.0032 | 4.90 | 0.0010 | 0.0100 | 0.0010 | 0.00010 | 0.60 |
| 56 | 0.0030 | 5.6 | 0.0010 | 0.0100 | 0.0010 | 0.00010 | 0.0032 | 4.80 | 0.0010 | 0.0100 | 0.0010 | 0.00010 | 0.60 |
| 57 | 0.0050 | 4.2 | 0.0010 | 0.0010 | 0.0010 | 0.00003 | 0.0050 | 2.70 | 0.0010 | 0.0010 | 0.0010 | 0.00003 | 1.50 |

*The balance is Fe and inevitable impurities.

TABLE 2

| | Magnetostriction | | | Sheet | Multilayer | Final annealing | Magnetic properties | | | |
|---|---|---|---|---|---|---|---|---|---|---|
| | Surface layer | Inner layer | | | | | | | | |
| No. | $\lambda_{1.0/400.1}$ $(10^{-6})$ | $\lambda_{1.0/400.0}$ $(10^{-6})$ | $\Delta\lambda_{1.0/400}$ $(10^{-6})$ | thickness t (mm) | ratio $t_1/t$ | temperature (° C.) | $W_{10/1k}$ (W/kg) | $B_{50}$ (T) | El (%) | Remarks |
| 1 | 2.2 | 2.2 | 0.00 | 0.20 | — | 980 | 42.9 | 1.70 | 25 | Comparative Example |
| 2 | 0.7 | 0.7 | 0.00 | 0.20 | — | 1000 | 37.8 | 1.62 | 3 | Comparative Example |
| 3 | 0.5 | 2.0 | <u>1.50</u> | 0.20 | 0.25 | 1000 | 42.0 | 1.58 | 10 | Comparative Example |
| 4 | 1.9 | 2.1 | 0.20 | 0.20 | 0.25 | 1000 | 38.5 | 1.67 | 14 | Example |
| 5 | 1.9 | 2.2 | 0.30 | 0.20 | 0.25 | 1000 | 38.0 | 1.68 | 16 | Example |
| 6 | 1.9 | 2.2 | 0.30 | 0.20 | 0.25 | 1000 | 38.2 | 1.67 | 15 | Example |
| 7 | 1.9 | 2.2 | 0.30 | 0.20 | 0.25 | 1000 | 38.0 | 1.68 | 15 | Example |
| 8 | 1.9 | 2.2 | 0.30 | 0.20 | 0.25 | 1000 | 37.9 | 1.68 | 15 | Example |
| 9 | 1.9 | 2.2 | 0.30 | 0.20 | 0.25 | 1000 | 38.2 | 1.67 | 17 | Example |
| 10 | 1.9 | 2.2 | 0.30 | 0.20 | 0.25 | 1000 | 37.8 | 1.69 | 15 | Example |
| 11 | 1.5 | 2.2 | 0.70 | 0.20 | 0.25 | 1000 | 39.3 | 1.67 | 17 | Example |
| 12 | 1.3 | 2.2 | 0.90 | 0.20 | 0.25 | 1000 | 39.2 | 1.66 | 15 | Example |
| 13 | 1.3 | 2.2 | 0.90 | 0.20 | 0.25 | 1000 | 39.1 | 1.66 | 15 | Example |
| 14 | 0.7 | 2.2 | <u>1.50</u> | 0.20 | 0.25 | 1100 | 40.0 | 1.64 | 15 | Comparative Example |
| 15 | 1.9 | 2.0 | 0.10 | 0.20 | 0.25 | 1100 | 41.0 | 1.71 | 20 | Comparative Example |
| 16 | 1.9 | 2.2 | 0.30 | 0.20 | 0.25 | 1100 | 38.1 | 1.70 | 17 | Example |
| 17 | 1.9 | 2.2 | 0.30 | 0.20 | 0.25 | 1100 | 38.0 | 1.70 | 17 | Example |
| 18 | 1.9 | 2.3 | 0.40 | 0.20 | 0.25 | 1000 | 38.0 | 1.65 | 16 | Example |
| 19 | 1.9 | 2.2 | 0.30 | 0.20 | 0.25 | 1000 | 40.1 | 1.65 | 14 | Comparative Example |
| 20 | 1.9 | 2.2 | 0.30 | 0.20 | 0.25 | 1000 | 38.0 | 1.68 | 2 | Comparative Example |
| 21 | 1.9 | 2.2 | 0.30 | 0.20 | 0.25 | 1000 | 38.0 | 1.68 | 11 | Example |
| 22 | 1.9 | 2.2 | 0.30 | 0.20 | 0.25 | 1000 | 38.1 | 1.68 | 11 | Example |
| 23 | 1.9 | 2.2 | 0.30 | 0.20 | 0.25 | 1000 | 38.0 | 1.68 | 22 | Example |
| 24 | 1.9 | 2.2 | 0.30 | 0.20 | 0.25 | 1000 | 38.1 | 1.68 | 25 | Example |
| 25 | 1.9 | 2.2 | 0.30 | 0.20 | 0.25 | 1000 | 42.0 | 1.68 | 20 | Comparative Example |
| 26 | 1.9 | 2.2 | 0.30 | 0.20 | 0.25 | 1000 | 38.0 | 1.68 | 15 | Example |
| 27 | 1.9 | 2.2 | 0.30 | 0.20 | 0.25 | 1000 | 38.0 | 1.68 | 9 | Comparative Example |
| 28 | 1.7 | 2.2 | 0.50 | 0.20 | 0.25 | 1000 | 38.0 | 1.68 | 16 | Example |
| 29 | 1.7 | 2.2 | 0.50 | 0.20 | 0.25 | 1000 | 38.0 | 1.68 | 18 | Example |
| 30 | 1.7 | 2.2 | 0.50 | 0.20 | 0.25 | 1000 | 38.0 | 1.68 | 19 | Example |
| 31 | 1.7 | 2.2 | 0.50 | 0.20 | 0.25 | 1000 | 38.6 | 1.68 | 20 | Example |
| 32 | 1.7 | 2.2 | 0.50 | 0.20 | 0.25 | 1000 | 39.0 | 1.67 | 20 | Example |
| 33 | 1.8 | 2.1 | 0.30 | 0.20 | 0.25 | 1000 | 38.2 | 1.68 | 18 | Example |
| 34 | 1.8 | 2.1 | 0.30 | 0.20 | 0.25 | 1000 | 38.0 | 1.69 | 18 | Example |
| 35 | 1.8 | 2.1 | 0.30 | 0.20 | 0.25 | 1000 | 38.1 | 1.69 | 17 | Example |
| 36 | 1.8 | 2.1 | 0.30 | 0.20 | 0.20 | 1000 | 38.0 | 1.69 | 18 | Example |
| 37 | 2.1 | 2.1 | 0.00 | 0.20 | <u>0.05</u> | 980 | 43.0 | 1.73 | 21 | Comparative Example |
| 38 | 2.1 | 2.1 | 0.00 | 0.20 | 0.15 | 980 | 39.6 | 1.70 | 21 | Example |
| 39 | 2.1 | 2.1 | 0.00 | 0.20 | 0.50 | 980 | 39.6 | 1.69 | 21 | Example |
| 40 | 2.1 | 2.1 | 0.00 | 0.20 | 0.65 | 980 | 39.7 | 1.67 | 20 | Example |
| 41 | 2.3 | 2.2 | 0.10 | 0.20 | 0.50 | 980 | 39.8 | 1.71 | 23 | Example |
| 42 | 2.3 | 2.2 | 0.10 | 0.20 | 0.50 | 980 | 39.9 | 1.71 | 23 | Example |
| 43 | 1.9 | 1.8 | 0.10 | 0.20 | 0.30 | 950 | 43.0 | 1.73 | 25 | Comparative Example |
| 44 | 2.1 | 2.1 | 0.00 | 0.20 | <u>0.80</u> | 980 | 40.0 | 1.68 | 20 | Comparative Example |
| 45 | 1.4 | 2.1 | 0.70 | 0.20 | 0.50 | 980 | 38.2 | 1.67 | 18 | Example |
| 46 | 0.7 | 1.7 | 1.00 | 0.20 | 0.30 | 980 | 39.0 | 1.64 | 13 | Example |
| 47 | 0.0 | 1.2 | <u>1.20</u> | 0.20 | 0.30 | 980 | 41.0 | 1.55 | 5 | Comparative Example |
| 48 | 2.1 | 1.8 | 0.30 | 0.20 | 0.30 | 950 | 42.0 | 1.71 | 21 | Comparative Example |

TABLE 2-continued

| | Magnetostriction | | | | | Final | Magnetic properties | | | |
|---|---|---|---|---|---|---|---|---|---|---|
| | Surface layer | Inner layer | | Sheet | Multilayer | annealing | | | | |
| No. | $\lambda_{1.0/400,1}$ $(10^{-6})$ | $\lambda_{1.0/400,0}$ $(10^{-6})$ | $\Delta\lambda_{1.0/400}$ $(10^{-6})$ | thickness t (mm) | ratio $t_1/t$ | temperature (° C.) | $W_{10/1k}$ (W/kg) | $B_{50}$ (T) | El (%) | Remarks |
| 49 | 2.0 | 2.3 | 0.30 | 0.20 | 0.30 | 1000 | 38.5 | 1.65 | 21 | Example |
| 50 | 1.2 | 2.0 | 0.80 | 0.20 | 0.30 | 1000 | 38.1 | 1.64 | 13 | Example |
| 51 | 0.4 | 1.0 | 0.60 | 0.20 | 0.30 | 1000 | 38.0 | 1.55 | 7 | Comparative Example |
| 52 | 1.9 | 2.2 | 0.30 | 0.20 | 0.30 | 1000 | 38.0 | 1.68 | 17 | Example |
| 53 | 1.9 | 2.2 | 0.30 | 0.10 | 0.30 | 1000 | 25.0 | 1.67 | 15 | Example |
| 54 | 1.9 | 2.2 | 0.30 | 0.07 | 0.30 | 1000 | 23.0 | 1.66 | 14 | Example |
| 55 | 0.7 | 1.4 | 0.70 | 0.25 | 0.30 | 1000 | 39.0 | 1.65 | 11 | Example |
| 56 | 0.6 | 1.5 | 0.90 | 0.25 | 0.30 | 1000 | 39.2 | 1.65 | 11 | Example |
| 57 | 1.9 | 2.2 | 0.30 | 0.20 | 0.30 | 1200 | 38.0 | 1.67 | 13 | Example |

REFERENCE SIGNS LIST

1 Multilayer electrical steel sheet
10 Inner layer
20 Surface layer

The invention claimed is:

1. A multilayer electrical steel sheet comprising an inner layer and surface layers provided on both sides of the inner layer, wherein
each of the surface layers has a chemical composition containing, in mass %,
C: 0.001% to 0.01%,
Si: 2.5% to 6.0%, and
Ti: 0% to 0.005%, with the balance being Fe and inevitable impurities,
the inner layer has a chemical composition containing
C: 0.001% to 0.01%,
Si: 1.5% to 5.0%, and
Ti: 0% to 0.005%, with the balance being Fe and inevitable impurities, and
the multilayer electrical steel sheet has:
$\Delta$Si of 0.5 mass % or more, $\Delta$Si being defined as a difference between a Si content in each of the surface layers $[Si]_1$ and a Si content in the inner layer $[Si]_0$ represented by $[Si]_1 - [Si]_0$;
$\Delta\lambda_{1.0/400}$ of $0.5 \times 10^{-6}$ or less, $\Delta\lambda_{1.0/400}$ being defined as an absolute value of the difference between a magnetostriction of each of the surface layers $\lambda_{1.0/400,1}$ and a magnetostriction of the inner layer $\lambda_{1.0/400,0}$;
a sheet thickness t of 0.03 mm to 0.3 mm; and
a ratio of a total thickness of the surface layers $t_1$ to t of from 0.10 to 0.70.

2. The multilayer electrical steel sheet according to claim 1, wherein at least one of the chemical composition of each of the surface layers or the chemical composition of the inner layer further contains, in mass %, B: 0.0001% to 0.0030%.

3. The multilayer electrical steel sheet according to claim 1, wherein at least one of the chemical composition of each of the surface layers or the chemical composition of the inner layer further contains, in mass %, at least one of Sn: 0.001% to 0.1% or Sb: 0.001% to 0.1%.

4. The multilayer electrical steel sheet according to claim 2, wherein at least one of the chemical composition of each of the surface layers or the chemical composition of the inner layer further contains, in mass %, at least one of Sn: 0.001% to 0.1% or Sb: 0.001% to 0.1%.

* * * * *